(12) United States Patent
Tang (10) Patent No.: US 12,061,393 B2
(45) Date of Patent: Aug. 13, 2024

(54) BACKLIGHT MODULE AND DISPLAY DEVICE

(71) Applicant: HUIZHOU CHINA STAR OPTOELECTRONICS DISPLAY CO., LTD., Guangdong (CN)

(72) Inventor: Liyuan Tang, Guangdong (CN)

(73) Assignee: HUIZHOU CHINA STAR OPTOELECTRONICS DISPLAY CO., LTD., Guangdong (CN)

( * ) Notice: Subject to any disclaimer, the term of this patent is extended or adjusted under 35 U.S.C. 154(b) by 0 days.

(21) Appl. No.: 17/754,248

(22) PCT Filed: Mar. 14, 2022

(86) PCT No.: PCT/CN2022/080567
§ 371 (c)(1),
(2) Date: Aug. 31, 2023

(87) PCT Pub. No.: WO2023/159686
PCT Pub. Date: Aug. 31, 2023

(65) Prior Publication Data
US 2024/0053636 A1 Feb. 15, 2024

(30) Foreign Application Priority Data
Feb. 28, 2022 (CN) .......................... 202210187594.6

(51) Int. Cl.
*G02F 1/13357* (2006.01)
*G02F 1/1335* (2006.01)

(52) U.S. Cl.
CPC .. *G02F 1/133611* (2013.01); *G02F 1/133524* (2013.01); *G02F 1/133603* (2013.01); *G02F 1/133607* (2021.01); *G02F 1/133608* (2013.01)

(58) Field of Classification Search
CPC ......... G02F 1/133611; G02F 1/133603; G02F 1/133608; G02F 1/133607;
(Continued)

(56) References Cited

FOREIGN PATENT DOCUMENTS

CN 104765097 A 7/2015
CN 108230923 A 6/2018
(Continued)

OTHER PUBLICATIONS

International Search Report in International application No. PCT/CN2022/080567, mailed on Jul. 28, 2022.
(Continued)

*Primary Examiner* — Erin Kryukova
(74) *Attorney, Agent, or Firm* — PV IP PC; Wei Te Chung; Zhigang Ma (57) ABSTRACT

The present application provides a backlight module and a display device. The backlight module includes a back plate and a light source substrate, wherein a plurality of protrusions are provided on the back plate, and a groove is defined between the protrusions adjacent to each other; and the light source substrate is disposed on the back plate and covers the protrusion. In the present application, a light guide plate is provided in the groove to direct each light in the groove toward a side away from the back plate, thereby effectively alleviating a problem of a loss of light energy between light source substrates adjacent to each other and ensuring brightness uniformity of the display panel.

16 Claims, 3 Drawing Sheets

(58) Field of Classification Search
CPC .......... G02F 1/133524; G02F 1/13336; G02B 6/0078; G02B 6/008
See application file for complete search history.

(56) References Cited

FOREIGN PATENT DOCUMENTS

| | | | | | |
|---|---|---|---|---|---|
| CN | 109613758 | A | | 4/2019 | |
| CN | 110488533 | A | | 11/2019 | |
| CN | 110703495 | A | | 1/2020 | |
| CN | 111552120 | A | | 8/2020 | |
| CN | 211237589 | U | | 8/2020 | |
| CN | 111915982 | A | * | 11/2020 | |
| CN | 111915982 | A | | 11/2020 | |
| CN | 112002217 | A | * | 11/2020 | ............... G09F 9/00 |
| CN | 112002217 | A | | 11/2020 | |
| CN | 112863390 | A | * | 5/2021 | ............... G09F 9/33 |
| CN | 112863390 | A | | 5/2021 | |
| CN | 113327515 | A | | 8/2021 | |
| JP | 3220267 | U | | 2/2019 | |
| KR | 20130125637 | A | * | 11/2013 | |
| TW | 201539403 | A | | 10/2015 | |

OTHER PUBLICATIONS

Written Opinion of the International Search Authority in International application No. PCT/CN2022/080567,mailed on Jul. 28, 2022.
Chinese Office Action issued in corresponding Chinese Patent Application No. 202210187594.6 dated Nov. 24, 2022, pp. 1-7.

* cited by examiner

BACKLIGHT MODULE AND DISPLAY DEVICE

TECHNICAL FIELD

The present application relates to a field of display technology, and in particular to a backlight module and a display device.

BACKGROUND

In a mini-light-emitting diode (Mini-LED) display, dimming in a smaller area is usually realized in a manner of a high density. Therefore, even under a premise of a small light mixing distance, good brightness uniformity, a bright picture color and a higher contrast may still be realized. With a high color gamut configuration, an effect of Mini-LED is comparable to an organic light-emitting diode (OLED). Meanwhile, with a high density, a requirement for brightness is easier to achieve than a conventional LED. At present, in view of the advantages of Mini-LED display, it has obvious advantages in ultra-thin, high color rendering and power saving, and the like, and has received extensive attention from major manufacturers.

However, in an application of an existing Mini-LED backlight module, there are still a lot of difficulties to be overcome. For example, firstly, since technical difficulties such as massive transfer in a current technology have not yet been overcome, a large-sized Mini-LED backlight module is usually realized by splicing light plates, and a splicing gap is inevitably defined between the light plates. Since a position at which the light plates spliced is where reflective sheets are spliced, a reflective sheet may not be disposed in the splicing gap. Thus, a light in the splicing gap may not be reflected, thereby causing a loss of light energy at the splicing gap and thus affecting the display effect and area diming. Secondly, although a small light mixing distance of Mini-LED brings a powerful advantage in ultra-thin applications, it also introduces a problem that a traditional support column projects a serious shadow on a diffuser plate, which affects screen display. Thirdly, a high density of LED lights may improve light efficiency, but cause problems such as high cost and difficult heat dissipation. Finally, when assembling the Mini-LED backlight modules with large-sized lights, due to a large number of the light plates, a mounting deviation easily occurs, thus affecting the efficiency.

Technical Problems

The embodiments of the present application provide a backlight module and a display device, hereby effectively alleviating a problem of a loss of light energy between the light source substrates adjacent to each other, and further ensuring brightness uniformity of the display panel.

SUMMARY

To solve the above problems, the present application provides the following technical solutions.

An embodiment of the present application provides a backlight module, comprising:
  a back plate, wherein a plurality of protrusions are provided on the back plate, and a groove is defined between the protrusions adjacent to each other;
  a light source substrate disposed on the back plate and covering the plurality of protrusions;
  a light guide plate disposed in the groove to direct each of lights in the groove toward a side away from the back plate.

In the backlight module provided in the embodiment of the present application, the light source substrate includes a first light source module covering the plurality of protrusions and a second light source module located on an inner wall of the groove;
  the first light source module includes a plurality of first light-emitting units disposed apart from each other, and the second light source module includes a plurality of second light-emitting units disposed apart from each other.
  wherein the light guide plate directs the lights emitted by each of the plurality of second light-emitting units in the groove toward the side away from the back plate.

In the backlight module provided in the embodiment of the present application, the light guide plate includes a light guide portion and a dot structure;
  wherein the light guide portion is at least partially located in the groove, and an orthographic projection of the light guide portion on the back plate is located on the plurality of protrusions; the dot structure is located between the light guide portion and the back plate, and the dot structure is disposed corresponding to the second light source module.

In the backlight module provided in the embodiment of the present application, the light guide portion includes a light guide body located in the groove, and a light guide branch portion located on a side of the light guide body away from the groove and disposed on the protrusions adjacent to each other;
  wherein an orthographic projection of the light guide body on the back plate is located in the groove, and an orthographic projection of the light guide branch portion on the back plate covers the groove.

In the backlight module provided in the embodiment of the present application, the light guide body is disposed apart from the second light source module, the light guide branch portion is disposed apart from the first light source module and the second light source module, and the orthographic projection of the light guide branch portion on the back plate covers the second light source modules adjacent to each other.

In the backlight module provided by the present embodiment, the dot structure includes a first dot between the light guide body and the groove, and a second dot between the light guide branch portion and the second light source module;
  wherein the first dot is disposed between the second light source modules adjacent to each other and corresponding to them, and the second dot is disposed on a side of the second light source module away from the back plate and corresponds to the second light source module.

In the backlight module provided in the embodiment of the present application, the backlight module further includes an optical film located on a side of the light guide plate away from the groove, wherein the optical film covers the back plate in a direction perpendicular to the backlight module;
  wherein a side of the optical film close to the light guide plate is parallel to a side of the light guide plate close to the optical film.

In the backlight module provided in the embodiment of the present application, a thickness of the light guide plate is greater than a sum of a thickness of the back plate and the light source substrate, and the optical film is disposed apart from the light source substrate.

In the backlight module provided in the embodiment of the present application, a distance between the optical film and the light source substrate ranges from 0.1 mm to 0.3 mm.

In the backlight module provided in the embodiment of the present application, a height of the projections ranges from 0.3 cm to 1 cm, and a width of the groove ranges from 2 cm to 4 cm.

An embodiment of the present application provides a display device comprising a display panel and a backlight module, wherein the backlight module includes:
  a back plate, wherein a plurality of protrusions are disposed on the back plate, and a groove is defined between the protrusions adjacent to each other;
  a light source substrate disposed on the back plate and covering the plurality of protrusions;
  a light guide plate disposed in the groove to direct each of lights in the groove toward a side away from the back plate.

In the display device provided in the embodiment of the present application, the light source substrate includes a first light source module covering the plurality of protrusions and a second light source module located on an inner wall of the groove;
  the first light source module includes a plurality of first light-emitting units disposed apart from each other, and the second light source module includes a plurality of second light-emitting units disposed apart from each other;
  wherein the light guide plate directs a light emitted by each of the lights of the plurality of second light-emitting units in the groove toward the side away from the back plate.

In the display device provided in the embodiment of the present application, the light guide plate includes a light guide portion and a dot structure;
  wherein the light guide portion is at least partially located in the groove, and an orthographic projection of the light guide portion on the back plate is located at least partially on the plurality of protrusions; the dot structure is located between the light guide portion and the back plate, and the dot structure is disposed corresponding to the second light source module.

In the display device provided in the embodiment of the present application, the light guide portion includes a light guide body located in the groove, and a light guide branch portion located on a side of the light guide body away from the groove and disposed on two adjacent the protrusions;
  wherein an orthographic projection of the light guide body on the back plate is located in the groove, and an orthographic projection of the light guide branch portion on the back plate covers the groove.

In the display device provided in the embodiment of the present application, the light guide body is disposed apart from the second light source module, the light guide branch portion is disposed apart from the first light source module and the second light source module, and the orthographic projection of the light guide branch portion on the back plate covers the second light source modules adjacent to each other.

In the display device provided in the present embodiment, the dot structure includes a first dot between the light guide body and the groove, and a second dot between the light guide branch portion and the second light source module; wherein the first dot is disposed between the second light source modules adjacent to each other and corresponding to them, and the second dot is disposed on a side of the second light source module away from the back plate and corresponds to the second light source module.

In the display device provided in the embodiment of the present application, the backlight module further includes an optical film located on a side of the light guide plate away from the groove, wherein the optical film covers the back plate in a direction perpendicular to the backlight module;
  wherein a side of the optical film close to the light guide plate is parallel to a side of the light guide plate close to the optical film.

In the display device provided in the embodiment of the present application, a thickness of the light guide plate is greater than a sum of a thickness of the back plate and the light source substrate, and the optical film is disposed apart from the light source substrate.

In the display device provided in the embodiment of the present application, a distance between the optical film and the light source substrate ranges from 0.1 mm to 0.3 mm.

In the display device provided in the embodiment of the present application, a height of the plurality of projections ranges from 0.3 cm to 1 cm, and a width of the groove ranges from 2 cm to 4 cm.

Beneficial Effects

Embodiments of the present application provide a backlight module and a display device. The backlight module includes a back plate and a light source substrate, wherein a plurality of protrusions are disposed on the back plate, and a groove is defined between the protrusions adjacent to each other. The light source substrate is disposed on the back plate and covers the protrusion. In an embodiment of the present application, a light guide plate is disposed in the groove to direct a light from the groove toward a side away from the back plate, thereby effectively alleviating a problem of a loss of light energy between the light source substrates adjacent to each other, and further ensuring brightness uniformity of the display panel.

BRIEF DESCRIPTION OF THE DRAWINGS

In order to more clearly illustrate the technical solutions in the embodiments of the present application, the accompanying drawings required for the description of the embodiments will be briefly described below. It will be apparent that the accompanying drawings in the following description are merely exemplified some embodiments of the present application, and other drawings may be obtained from these drawings without creative effort by those skilled in the art.

DETAILED DESCRIPTION OF THE EMBODIMENTS

The present application provides a backlight module and a display device. In order to make objects, technical solutions and effects of the present application more clear, the present application is described in detail with reference to the accompanying drawings and embodiments. It should be understood that the specific embodiments described herein are intended to explain the present application only and are not intended to limit the present application.

Embodiments of the present application provide a backlight module and a display device. Detailed description will be followed below. It should be noted that an order of description of the following embodiments is not a limitation on a preferred order of the embodiments.

Figure 2:
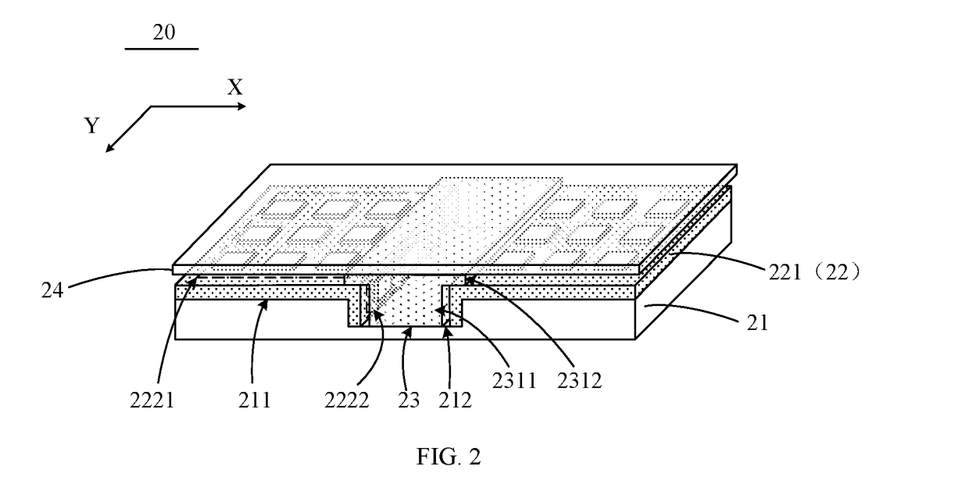
FIG. 2 is a schematic perspective diagram of a backlight module according to an embodiment of the present application.
Figure 3:
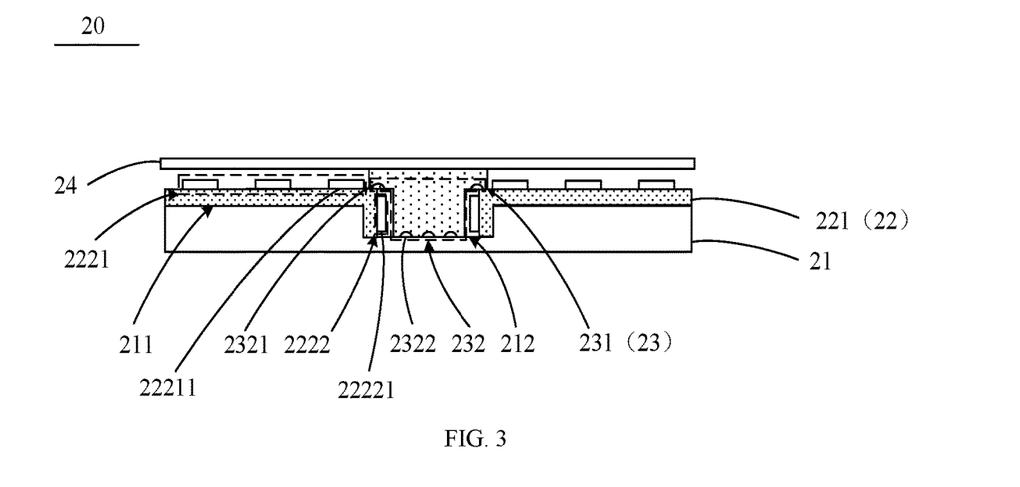
FIG. 3 is a schematic cross-sectional diagram of a backlight module according to an embodiment of the present application.
Figure 4:
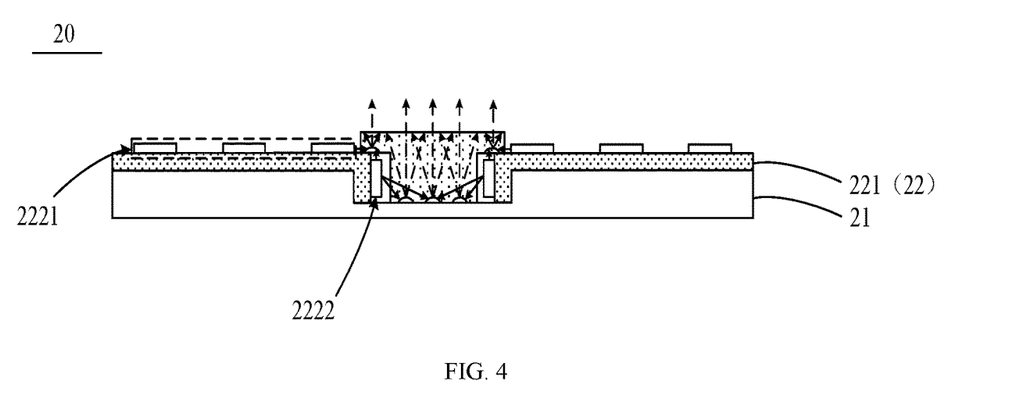
FIG. 4 is a light path diagram in a backlight module according to an embodiment of the present application.

Referring to FIG. 2 to FIG. 4, an embodiment of the present application provides a backlight module and a display device. The backlight module 20 includes:

a back plate 21, wherein a plurality of projections 211 are disposed on the back plate 21, and a groove 212 is defined between the projections 211 adjacent to each other;

a light source substrate 22 disposed on the back plate 21 and covering the protrusions 211; and a light guide plate disposed in the groove to direct each of lights in the groove toward a side away from the back plate.

Figure 1:
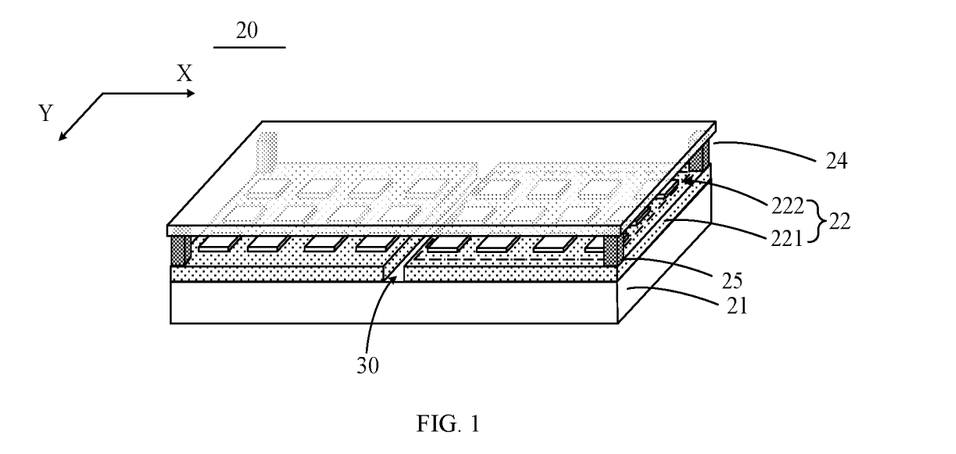
FIG. 1 is a schematic perspective diagram of a backlight module in prior art.

It may be understood that, in the present display of micro-light-emitting diode (Mini-LED) display, dimming in a smaller area is usually realized in a manner of a high density. Therefore, even under a premise of a small light mixing distance, good brightness uniformity may still be realized with bright picture color and a higher contrast, thus, attracting a wide attention of various manufacturers. However, in a Mini-LED backlight module in the prior art, there are still many difficulties to be overcome. As shown in FIG. 1, which is a schematic perspective diagram of the backlight module in the prior art, the backlight module 20 includes a back plate 21, and at least two light source substrates 22 disposed on the back plate 21. The light source substrate 22 includes a printed circuit board 221 (PCB), a reflective sheet (not shown in the Figure), and a light source module 222 stacked on the back plate 21. The light source substrate 22 is a mini-light-emitting diode light plate, and the light source module 222 is a mini-light-emitting diode.

Since technical difficulties such as massive transfer in a current technology have not yet been overcome, the large-sized Mini-LED backlight module 20 is realized by splicing, that is, the large-sized backlight module 20 is realized by splicing two spaced light source substrates 22 on the back plate 21 in the prior art. However, since it is inevitable that a splicing gap 30 is defined between the light source substrates 22 adjacent to each other, and the reflective sheet (not shown) may not be disposed at the splicing gap 30, wherein the reflective sheet is used to reflect a light emitted by the light source module 222 toward a direction perpendicular to the backlight module 20. Thus, in the existing backlight module 20, the light emitted by the light source module 222 toward the splicing gap 30 may not be reflected, resulting in a loss of light energy at the splicing gap 30, thereby affecting the display effect and the area dimming.

In the embodiment of the present application, the back plate 21 includes a plurality of protrusions 211, and a groove 212 between the protrusions 211 adjacent to each other, wherein the plurality of protrusions 211 are disposed on a side of the back plate 21 toward to the light source substrate 22, and the light source substrate 22 is disposed on the back plate 21 and covers the plurality of protrusions 211. The backlight module 20 further includes a light guide plate 23 disposed in the groove 212, the light guide plate 23 directs each of lights from the groove 212 toward a side away from the back plate 21, thereby effectively alleviating a problem of a loss of light energy between the light source substrates 22 adjacent to each other, and further ensuring brightness uniformity of the display device.

In an embodiment, reference is made to FIG. 2 in which a schematic perspective diagram of a backlight module according to an embodiment of the present application is provided.

In the embodiment of the present application, the backlight module 20 includes a back plate 21 and at least two light source substrates 22 disposed on the back plate 21, wherein the light source substrates 22 adjacent to each other are disposed in parallel in a first direction X or a second direction Y, and the first direction X and the second direction Y include a predetermined angle. In the embodiment, the first direction is referring to a direction of X and the second direction is referring to a direction of Y. In the embodiment, a range of the predetermined angle and the directions of the first direction and the second direction are not limited. However, for convenience of description, in the embodiment, an example is taken where the predetermined angle is 90°, the first direction is referring to a direction of X, and the second direction is referring to a direction of Y. Specifically, in the embodiment, an example is taken to illustrate the technical solution of this application where the backlight module 20 includes two light source substrates 22 disposed on the back plate 21, and the light source substrates 22 adjacent to each other are disposed in parallel along the first direction X.

Wherein the back plate 21 includes a plurality of projections 211 corresponding to the light source substrate 22, and a groove 212 disposed between the projections 211 adjacent to each other. Specifically, in the embodiment, an example is taken to illustrate the technical solution of this application where the back plate 21 includes two protrusions 211 provided corresponding to the light source substrate 22 and a groove 212 provided between the protrusions 211 adjacent to each other.

The light source substrate 22 covers the protrusion 211. Specifically, the light source substrate 22 includes a first light source module 2221 on the protrusion 211 and a second light source module 2222 on an inner wall of the groove 212. It should be illustrated that, in the embodiment of the present application, an end surface of a side of the projection 211 is on the same plane with the inner wall of the groove 212, a height of the projection 211 ranges from 0.3 cm to 1 cm, and a width of the groove 212 ranges from 2 cm to 4 cm. The height of the projection 211 and the width of the groove 212 may be selected according to the actual process, and specified limits thereon are not made in the embodiment. Meanwhile, the light source substrate 22 is described as a mini-light-emitting diode light plate as an example, unless otherwise specified.

Specifically, the light source substrate 22 includes a circuit board 221 (PCB) secured to the back plate 21, the circuit board 221 includes a first portion (not shown) located between the protrusion 211 and the first light source module 2221, and a second portion (not shown) located between the inner wall of the groove 212 and the second light source module 2222, wherein each of the first light source module 2221 and the second light source module 2222 includes a plurality of mini-light-emitting diodes (not shown), and a circuit board pad is provided on an upper surface of the circuit board 221. The circuit board pad cooperates with chip pads at bottoms of the mini-light-emitting diodes, and the mini-light-emitting diodes are mounted on the circuit board 221 by soldering or eutectic of the chip pads or the circuit board pad.

It may be understood that, the conventional backlight module 20 generally adopts a manner of laying a plurality of light source substrates 22 on the entire back plate 21, thereby causing against to alignment of the light source substrate 22 with the back plate 21. Compared with the conventional backlight module 20 in the prior art, in the embodiment of the present application, two protrusions 211 and the groove 212 between the protrusions 211 are disposed on the backlight module 21, and one light source substrate 22 is provided corresponding to one of the protrusions 211, so that a bonding position between the light source substrate 22 and the back plate 21 may be better located, and meanwhile the groove 212 between the protrusions 211 are provided to reserve a space for mounting the second light source module 2222 on the inner wall of the grooves 212, thereby simplifying a preparation process of the backlight module 20. Further, by providing the first light source module 2221 located on the protrusion 211 and the second light source module 2222 located on the inner wall of the groove 212, the number of mini-light-emitting diodes is reduced to some extent, thereby improving the heat dissipation capability of the backlight substrate and the service life of the backlight module 20.

In the embodiment, the backlight module 20 further includes a light guide plate 23 located on the back plate 21 and corresponding to the groove 212, and the light guide plate 23 is used to direct each light emitted by the second light source modules 2222 in the groove 212 out off from a side of the light guide plate 23 away from the back plate 21. It should be understood that, in the embodiment, the light guide plate 23 is disposed on the back plate 21 and corresponding to the groove 212, and the light guide plate 23 is used to direct each light emitted by the second light source modules 2222 in the groove 212 out off from the side of the light guide plate 23 away from the back plate 21, thereby effectively alleviating the problem of a loss of light energy between the light source substrates 22 adjacent to each other and further ensuring brightness uniformity of the display device.

References are made to FIGS. 3 and 4, wherein FIG. 3 is a schematic cross-sectional diagram of the backlight module according to an embodiment of the present application, and FIG. 4 is a light path diagram of the backlight module according to an embodiment of the present application.

In the embodiment of the present application, the light guide plate 23 includes a light guide portion 231 and a dot structure 232, wherein the light guide portion 231 is at least partially located in the groove 212, and an orthographic projection of the light guide portion 231 on the back plate 21 is located on the protrusion 211. The dot structure 232 is disposed between the light guide portion 231 and the back plate 21, and the dot structure 232 is disposed corresponding to the second light source module 2222.

Preferably, the light guide portion 231 includes a light guide body 2311 located in the groove 212, and a light guide branch portion 2312 located on a side of the light guide body 2311 away from the groove 212 and disposed on the protrusions 211 adjacent to each other. An orthographic projection of the light guide branch portion 2312 on the back plate covers the second light source module 2222. Specifically, the light guide body 2311 is disposed apart from the first light source module 2221 and the second light source module 2222, and the light guide branch portion 2312 is disposed apart from the first light source module 2221 and the second light source module 2222.

The dot structure 232 includes a first dot 2321 between the light guide body 2311 and the groove 212, and a second dot 2322 between the light guide branch portion 2312 and the second light source module 2222, wherein the first dot 2321 is located between the second light source modules 2222 adjacent to each other and corresponds to two of the second light source modules 2222, and the second dot 2322 is located on a side of the second light source module 2222 away from the back plate 21 and corresponds to the second light source module 2222. Specifically, the dot structure 232 includes a plurality of the first dots 2321 and a plurality of the second dots 2322, the plurality of the first dots 2321 are disposed in the groove 212 in an array and located in an orthogonal projection of the light guide body 2311 on the groove 212, and the plurality of the second dots 2322 are disposed corresponding to the second light source module 2222.

It should be understood that in the embodiment of the present application, lights emitted by the second light source module 2222 are transmitted in the light guide portion 231, and when the lights are scattered by the second dot 2322 provided in the light guide portion 231, a part of the lights scattered by the second dot 2322 is emitted out off from an upper surface of the light guide portion 231, that is, a side of the light guide portion 231 away from the back plate 21, and a part of the lights is continuously transmitted in the light guide portion 231 until scattered again by the second dot 2322. Then the lights are emitted out off from the side of the light guide portion 231 away from the back plate 21, thereby effectively alleviating the problem of a loss of light energy between the light source substrates 22 adjacent to each other. In FIG. 4, a propagation direction of the light in the light guide portion 231 is indicated by a solid line with an arrow, and the scattered light is indicated by a dotted line with an arrow.

Further, the first light source module 2221 includes a plurality of first light-emitting units 22211 disposed close to the groove 212 and spaced apart from each other, the second light source module 2222 includes a plurality of second light-emitting units 22221 disposed close to the protrusion 211 and spaced apart from each other. The first light-emitting units 22211 are disposed corresponding to the second light-emitting units 22221. In a first light-emitting unit 22211 and a second light-emitting unit 22221 corresponding thereto, the second dot 2322 is configured to correspond to a light-emitting side of the first light-emitting unit 22211 and also correspond to a light-emitting side of the second light-emitting unit 22221. In the embodiment, the number of the first light-emitting units 22211 and the second light-emitting units 22221 is not specifically limited.

It should be understood that in the embodiment of the present application, one of first light-emitting units 22211 is provided to correspond to one of a second light-emitting units 22221. For the first light-emitting unit 22211 and the second light-emitting unit 22221 corresponding thereto, the second dot 2322 is configured to correspond to a light-emitting side of the first light-emitting unit 22211 and also correspond to a light-emitting side of the second light-emitting unit 22221, so that the lights emitted by the first light-emitting unit 22211 and the light emitted by the second light-emitting unit 22221 may be mixed more uniformly, thereby achieving a purpose of uniformly emitting lights at an interface between the protrusion 211 and the groove 212 in the backlight module 20.

Further, the backlight module 20 further includes an optical film 24 located on a side of the light guide plate 23 away from the groove 212, and an orthographic projection of the optical film 24 on a direction perpendicular to backlight module 20 covers the backlight plate 21. A surface of the optical film 24 close to the light guide plate 23 is parallel to a surface of the light guide plate 23 close to the optical film 24.

Specifically, the optical film 24 is located on a side of the light guide branch portion 2312 away from the back plate 21, and a side of the optical film 2312 close to the light guide branch portion 2312 is parallel to a side of the light guide branch portion 2312 close to the optical film 24. A thickness of the light guide body 2311 ranges from 0.3 cm to 1 cm, and a thickness of the light guide branch portion 2312 ranges from 0.2 cm to 0.5 cm, and both the thickness of the light guide body 2311 and the thickness of the light guide branch portion 2312 may be selected according to an actual process, which is not specifically limited in the embodiment.

It should be understood that, referring to FIG. 1, the conventional backlight module 20 further includes an optical film 24 located on the backlight module 20, and a support post 25 located between the optical film 24 and the backlight module 20. An orthographic projection of the support post 25 on the backlight module 20 is located on the light source substrate 22. However, it should be noted that, in the prior art, the support post 25 is located between the optical film 24 and the backlight module 20, and therefore, a light emitted by the light source module 222 is partially shielded by the support post 25 to generate shadows, thus, seriously affecting optical uniformity and the visual effect of the backlight module. In the embodiment of the present application, the optical film 24 is disposed on the side of the light guide branch portion 2312 away from the back plate 21, so that the light guide portion 231 replaces the support post 25 in the prior art, thereby avoiding an occurrence of a bad phenomenon such as shadows caused by the support post 25 in the prior art. At the same time, the surface of the optical film 24 close to the light guide branch portion 2312 is parallel to the surface of the light guide branch portion 2312 close to the optical film 24, so that a contact surface between the light guide branch portion 2312 and the optical film 24 is increased, and the optical film 24 is uniformly stressed and does not burst.

Further, in the embodiment of the present application, a thickness of the light guide plate 23 is greater than a sum of a thickness of the back plate 21 and the light source substrate 22, and the optical film 24 is disposed apart from the light source substrate 22. Specifically, a sum of a thicknesses of the light guide body 2311 and the light guide branch portion 2312 is greater than the sum of the thicknesses of the back plate 21 and the light source substrate 22, so that the optical film 24 on a side of the light guide branch portion 2312 away from the back plate 21 may be disposed apart from the light source substrate 22, and a distance therebetween ranges from 0.1 mm to 0.3 mm. It should be understood that in the embodiment of the present application, the optical film 24 is disposed apart from the light source substrate 22, and the spacing distance therebetween ranges from 0.1 mm to 0.3 mm, so that a problem that the optical film 24 is too close to the light source substrate 22 to reduce an overall brightness of the backlight module 20, is avoided.

Figure 5:
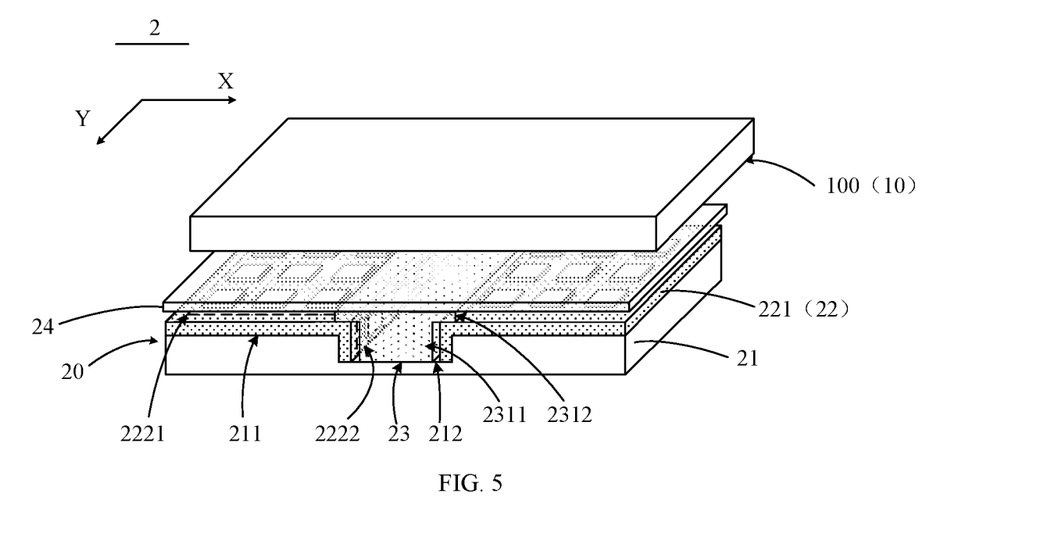
FIG. 5 is a schematic perspective diagram of a display device according to an embodiment of the present application.

Reference is made to FIG. 5 which is a schematic perspective diagram of a display device according to an embodiment of the present application.

An embodiment of the present application provides a display device including a display panel 10 and the backlight module 20 described in any of the above embodiments.

In the embodiment of the present application, the display panel 10 includes a display area 100 and a non-display area (not shown) adjacent to the display area 100, wherein the backlight module 20 is located on a backlight side of the display panel 10 and disposed to correspond to the display area 100.

It should be noted that in the embodiment, the display panel 10 includes but is not limited to a liquid crystal display (LCD). In the embodiment, a liquid crystal display (LCD) is taken as an example to illustrate the display panel 10.

It should be understood that the backlight module 20 has been described in detail in the above-described embodiment, and the description for the use in the display panel is not repeated herein.

In a specific application, the display device may be a display screen of a device such as a smartphone, a tablet computer, a notebook computer, a smart band, a smart watch, smart glasses, a smart helmet, a desktop computer, a smart television, or a digital camera, or may even be applied to an electronic device having a flexible display screen.

The present application provides a backlight module and a display device. The backlight module includes a back plate and a light source substrate, a plurality of protrusions are disposed on the back plate, and a groove is defined between the protrusions adjacent to each other. The light source substrate is disposed on the back plate and covers the protrusion. In an embodiment of the present application, a light guide plate is disposed in the groove to direct a light from the groove toward a side away from the back plate, thereby effectively alleviating a problem of a loss of light energy between the light source substrates adjacent to each other, and further ensuring brightness uniformity of the display panel.

It should be understood that those skilled in the art may make equivalent replacements or changes in accordance with the technical solutions of the present application and the inventive concepts thereof, all of which shall fall within the scope of the claims appended hereto.

What is claimed is:
1. A backlight module, comprising:
 a back plate, wherein a plurality of protrusions are provided on the back plate, and a groove is defined between the protrusions adjacent to each other;
 a light source substrate disposed on the back plate and covering the plurality of protrusions; and
 a light guide plate disposed in the groove;
 wherein the light source substrate comprises a first light source module covering the plurality of protrusions and a second light source module located on an inner wall of the groove;
 the first light source module comprises a plurality of first light-emitting units disposed apart from each other, and the second light source module comprises a plurality of second light-emitting units disposed apart from each other;
 wherein the light guide plate directs the lights emitted by each of the plurality of second light-emitting units in the groove toward the side away from the back plate;
 wherein the light guide plate comprises a light guide portion and a dot structure;

wherein the light guide portion is at least partially located in the groove, and an orthographic projection of the light guide portion on the back plate is located at least partially on the plurality of protrusions; the dot structure is located between the light guide portion and the back plate, and the dot structure is disposed corresponding to the second light source module.

2. The backlight module according to claim 1, wherein the light guide portion comprises a light guide body located in the groove, and a light guide branch portion located on a side of the light guide body away from the groove and disposed on the protrusions adjacent to each other;

wherein an orthographic projection of the light guide body on the back plate is located in the groove, and an orthographic projection of the light guide branch portion on the back plate covers the groove.

3. The backlight module according to claim 2, wherein the light guide body is disposed apart from the second light source module, the light guide branch portion is disposed apart from the first light source module and the second light source module, and the orthographic projection of the light guide branch portion on the back plate covers the second light source modules adjacent to each other.

4. The backlight module according to claim 2, wherein the dot structure comprises a first dot between the light guide body and the groove, and a second dot between the light guide branch portion and the second light source module;

wherein the first dot is disposed between and corresponds to the second light source modules adjacent to each other, and the second dot is disposed on a side of the second light source module away from the back plate and corresponds to the second light source module.

5. The backlight module according to claim 1, wherein the backlight module further comprises an optical film located on a side of the light guide plate away from the groove, wherein the optical film covers the back plate in a direction perpendicular to the backlight module;

wherein a side of the optical film close to the light guide plate is parallel to a side of the light guide plate close to the optical film.

6. The backlight module according to claim 5, wherein a thickness of the light guide plate is greater than a sum of a thickness of the back plate and the light source substrate, and the optical film is disposed apart from the light source substrate.

7. The backlight module according to claim 6, wherein a distance between the optical film and the light source substrate ranges from 0.1 mm to 0.3 mm.

8. The backlight module according to claim 1, wherein a height of the plurality of projections ranges from 0.3 cm to 1 cm, and a width of the groove ranges from 2 cm to 4 cm.

9. A display device, comprising a display panel and a backlight module, wherein the backlight module comprises:

a back plate, wherein a plurality of protrusions are provided on the back plate, and a groove is defined between the protrusions adjacent to each other;

a light source substrate disposed on the back plate and covering the plurality of protrusions; and a light guide plate disposed in the groove;

wherein the light source substrate comprises a first light source module covering the plurality of protrusions and a second light source module located on an inner wall of the groove;

the first light source module comprises a plurality of first light-emitting units disposed apart from each other, and the second light source module comprises a plurality of second light-emitting units disposed apart from each other;

wherein the light guide plate directs the lights emitted by each of the plurality of second light-emitting units in the groove toward the side away from the back plate;

wherein the light guide plate comprises a light guide portion and a dot structure;

wherein the light guide portion is at least partially located in the groove, and an orthographic projection of the light guide portion on the back plate is located at least partially on the plurality of protrusions; the dot structure is located between the light guide portion and the back plate, and the dot structure is disposed corresponding to the second light source module.

10. The display device according to claim 9, wherein the light guide portion comprises a light guide body located in the groove, and a light guide branch portion located on a side of the light guide body away from the groove and disposed on the protrusions adjacent to each other;

wherein an orthographic projection of the light guide body on the back plate is located in the groove, and an orthographic projection of the light guide branch portion on the back plate covers the groove.

11. The display device according to claim 10, wherein the light guide body is disposed apart from the second light source module, the light guide branch portion is disposed apart from the first light source module and the second light source module, and the orthographic projection of the light guide branch portion on the back plate covers the second light source modules adjacent to each other.

12. The display device according to claim 10, wherein the dot structure comprises a first dot between the light guide body and the groove, and a second dot between the light guide branch portion and the second light source module;

wherein the first dot is disposed between and corresponds to the second light source modules adjacent to each other, and the second dot is disposed on a side of the second light source module away from the back plate and corresponds to the second light source module.

13. The display device according to claim 9, wherein the backlight module further comprises an optical film located on a side of the light guide plate away from the groove, wherein the optical film covers the back plate in a direction perpendicular to the backlight module;

wherein a side of the optical film close to the light guide plate is parallel to a side of the light guide plate close to the optical film.

14. The display device according to claim 13, wherein a thickness of the light guide plate is greater than a sum of a thickness of the back plate and the light source substrate, and the optical film is disposed apart from the light source substrate.

15. The display device according to claim 14, wherein a distance between the optical film and the light source substrate is from 0.1 mm to 0.3 mm.

16. The display device according to claim 9, wherein a height of the plurality of projections ranges from 0.3 cm to 1 cm, and a width of the groove ranges from 2 cm to 4 cm.

* * * * *